Dec. 20, 1932.  B. M. STANNARD  1,891,457
VEHICLE SEAT ADJUSTER
Filed July 31, 1930    2 Sheets-Sheet 1
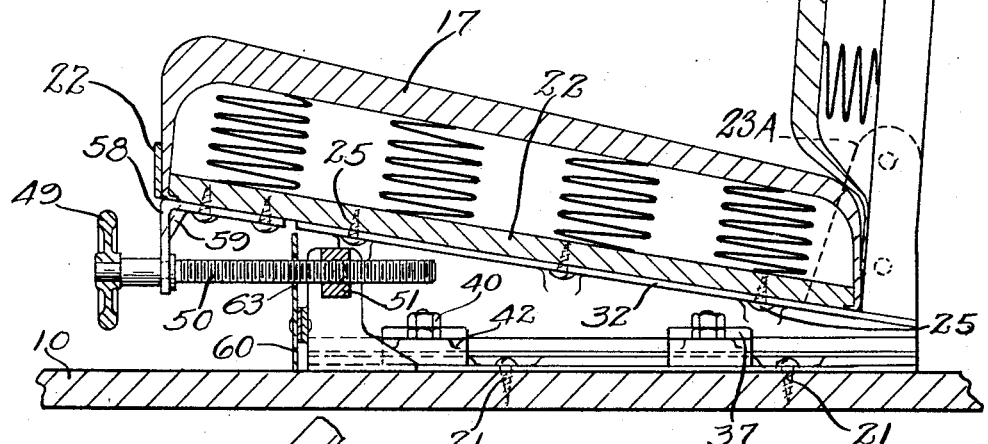
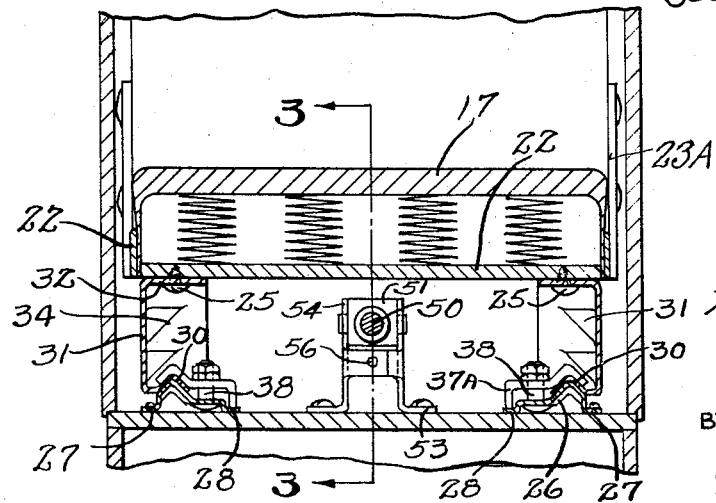
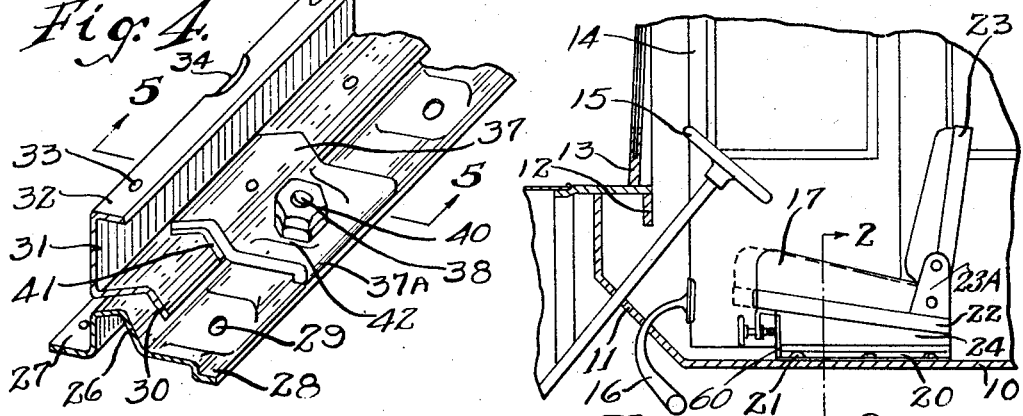
INVENTOR
Bruce M. Stannard.
BY
Louis Illmer
HIS ATTORNEY Dec. 20, 1932.  B. M. STANNARD  1,891,457
VEHICLE SEAT ADJUSTER
Filed July 31, 1930  2 Sheets-Sheet 2

INVENTOR
Bruce M. Stannard.
BY Louis Ellmer.
HIS ATTORNEY

Patented Dec. 20, 1932

1,891,457

UNITED STATES PATENT OFFICE

BRUCE M. STANNARD, OF BINGHAMTON, NEW YORK, ASSIGNOR TO THE BREWER-TITCHENER CORPORATION, OF CORTLAND, NEW YORK, A CORPORATION OF NEW YORK

VEHICLE SEAT ADJUSTER

Application filed July 31, 1930. Serial No. 471,934.

This invention relates to improved means for effectively adjusting automobile or like vehicle seats, and in particular provides for a comfortable driver's seat that can readily be shifted toward or away from the steering gear, and otherwise allows of an unfettered manipulation of the car pedals.

An outstanding feature of the present disclosure resides in the use of a pair of composite guide-ways of the tongue and groove type, each provided with coperating keeper members respectively adapted to clampingly retain a slidable seat-base flange therebetween, and which keepers are detachable and made adjustable against seat rattle or to take up rail wear, thus allowing a loaded seat to glide snugly along said rails without requiring a correspondingly close fit to be maintained throughout the assembly.

The object of these improvements is to provide for a durable rattle-proof seat mechanism of the character indicated and largely comprising simple sheet-metal stampings that are capable of being economically fabricated and fitted beneath the front seat of a conventional automobile without necessitating any extensive alterations in the prevailing structure thereof.

A further object is to provide for complementary pairs of directly separable and relatively slidable guide rail elements or individually assembled runway strips that are each given a cooperative cross-sectionally V-shaped profile. Each such independent rail assembly carries self-contained keepers that hold the component rail elements in interlocked relation, which allows of preadjusting the slide fit therebetween and of completing a unitary sub-base structure prior to mounting my shiftable seat thereacross. The bridging seat base is preferably equipt with an upright back and the detachable keepers serve as an anti-tilting means therefor, the unitary seat and back disposition being such as to allow freedom of base travel lengthwise of the runways but not crosswise thereof; and after the retaining keepers have been dismantled, said base is allowed to be bodily lifted off and outwardly away from the runway parting plane in any intermediate position of its shiftable travel range. My improved manipulative seat adjusting screw is so arranged that it will automatically release itself from the base without opposition to the free lift movement thereof.

To this end and the accomplishment of other new and useful results, said invention further consists in novel features of seat structure, all of which will hereinafter be more fully set forth.

Reference is had to the accompanying two sheets of drawings which are illustrative of a specific embodiment of my invention particularly as applied to automobile purposes, and in which drawings:

Fig. 1 is a fragmentary elevational view as taken in longitudinal section through the body portion of a motor car, showing the front seat thereof equipt with my improved adjusting mechanism.

Fig. 2 represents an elevational view as taken along the section line 2—2 of Fig. 1 while Fig. 3 shows a sectional view of this same seat assembly as taken longitudinally along the line 3—3 of Fig. 2.

Fig. 4 is a perspective showing my guide rail assembly as equipt with an adjustable keeper.

Fig. 7 is a screw mechanism as taken in elevational section to show an enlarged forward portion of Fig. 3, while

Figure 5:
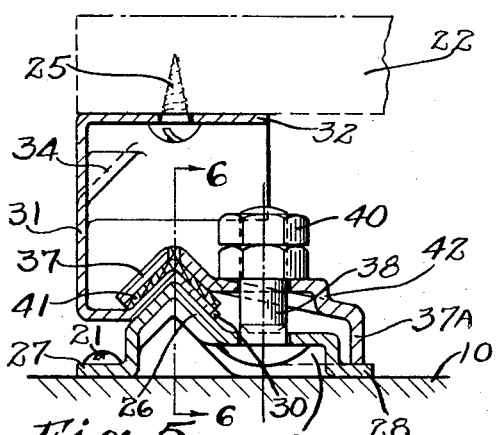
Fig. 5 is a sectional view thereof as taken along line 5—5 of Fig. 4.

Referring first to Fig. 1, this is intended to schematically indicate certain conventional motor-car elements that may be indirectly associated with my devices, such as the body floor board 10, an upturned foot board 11, an instrument board 12, a windshield 13, a front side-door 14, a steering wheel 15, a car control pedal 16 and the like.

Located rearwardly of said wheel is shown a transversely disposed driver's seat 17 equipt with my improvements and which seat is provided with a back 23 that may be braced by brackets such as 23A; this crossseat is mounted to bridge a pair of laterally spaced guide rails or tracks 20, preferably stamped up from sheet metal and which may be fixedly anchored to the floor board 10 by screws 21. Said seat further comprises a rectangular seat base board or cushion carrier 22; depending from each of the respective seat ends, is a side-bar such as 24 (see Fig. 1) which may be secured underneath said base board by screws 25 or the like, and made slidably to cooperate with their respective rails.

Figure 6:
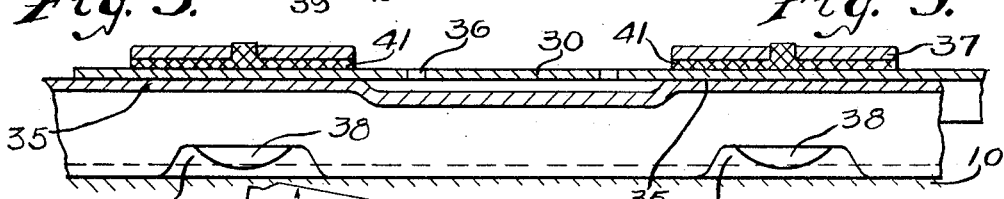
Fig. 6 represents a longitudinal sectional view of said rail assembly as taken along line 6—6 of Fig. 5.

In the type shown in Figs. 4 to 6, my rail structure is of the superimposed two-part type and preferably embodies a struck-up sheet-metal rail-head 26 of the cross-sectionally inverted V type, of which one of its longitudinal edges may be offset and carried downwardly and outwardly to form a narrow foot-flange 27, although this is not an essential expedient. The other longitudinal edge of said head may be oppositely disposed to constitute a bolt-flange 28 that is preferably made to align with the flange 27 and drilled as at 29 to receive the screw 21 or like floor fastening means.

The channel-like side-bar 24 comprises a V grooved toe-piece 30 whose counterpart profile is arranged to receive the registering ridge face of said rail head and together constitute tongue and groove guide means. Extending in upright relation from one edge of the said toe piece, is a web plate or riser 31 which may be longitudinally tapered to give a rearward inclination to the seat base board. The uppermost region of each sidebar may be inturned to form an integral topflange 32 which is shown drilled at 33 to receive the attaching screws 25. A plurality of corner brace ribs such as 34 may be spacedly indented into one face of each web plate to impart augmented lateral rigidity to the respective side-bars.

The seat 17 with its back 23 is intended to be bodily shifted under load of its occupants, and to the end that friction between the cooperating tongue and grooved guide members may be reduced, the spaced wear faces 35 are confined toward the respective rail ends in the fashion shown in Fig. 6. Accordingly, the major length portion of the rail head 26 may be kept recessed at its central region to afford clearance space, and the toe piece 30 provided with an oil hole 36 through which to lubricate the sliding end surfaces. The elimination of all rollers makes for a compact rail structure that lends itself to economical manufacture.

In order to adjustably hold said complementary V-shaped guides in the desired operative relation and also to prevent the seat and back from tilting rearwardly, I further provide each of my guideways with one or more releasable clamps or keepers such as 37, which may be superimposed upon the respective toe-pieces and individually retained in place by a carriage type of bolt 38. The relatively thin head of this bolt is preferably located in an offset side-pocket 39 formed in the bolt-flange 28 with the bolt shank entered through a punched flange hole and provided with an adjustable nut 40 in the manner represented in Fig. 5. Each rail clamp is preferably given an angular profile of which one leg may be horizontally disposed and its free edge formed into a V-shape placed to straddle the similar top surface of the bar-toe 30. Interposed therebetween is a felt lubricating pad 41 or the like, provided with a feed tit which at the same time keeps the pad in fixed position. The opposite clamp leg may be turned down to rest upon the topmost edge region of the bolt flange 28 to form a cocking edge 37A for the intermediate flat clamp portion that is shown as bumped up into an apertured boss 42. The upturned shank of the clamping bolt is entered therethrough and when tightened up, draws together the slidably fitted members 26 and 30 in the proximity of their respective contacting faces.

By virtue of the described structure, the seat load is concentrated and preferably borne only upon the respective rail end regions and provision is made for keeping the gliding surfaces well lubricated. The slide fit on part of the interposed clamped toe of the side-bar can readily be adjustably set to suit requirements in order to compensate for wear, and also to allow for normal variations in metal thickness or fabrication inaccuracies. The taking up any slackness in the sliding fit, not only prevents rattle but properly holds down the movable seat without undue tilting or side-sway when wrenched. In case the guides should work somewhat stiff, a slackening off of the clamp bolts eases the seat shifting effort and allows the seat to be evenly guided along the rails without tendency to bind or run sidewise therefrom.

Figure 7:
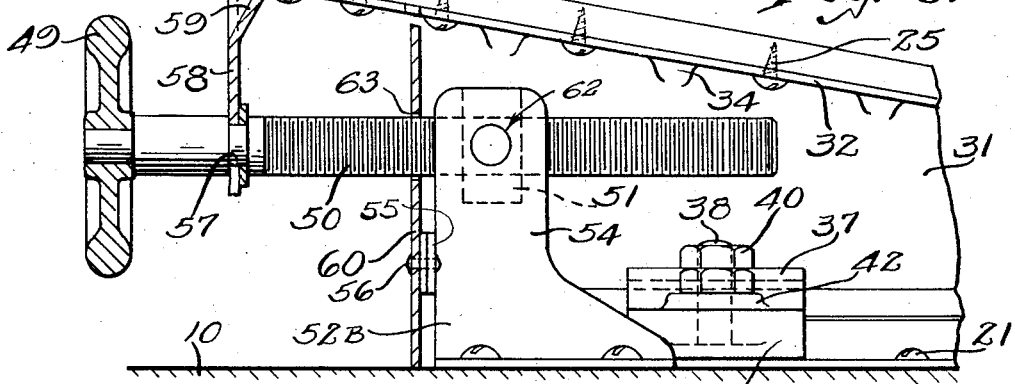
Figure 8:
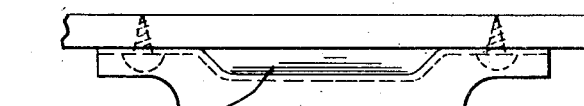
Fig. 8 illustrates a front or transverse view of Fig. 7.

Now will be described suitable manipulative means by which the seat may be bodily shifted along said rails. As shown in Figs. 7 and 8 this may comprise a seat screw 50 having its axis disposed parallelly between the complementary rails. The rearward end of said screw may be provided with an oppositely trunnioned nut 51 and the respective trunnions thereof may be pivotally carried by complementary prop brackets such as 52A and 52B. These angular brackets each preferably comprise a support flange 53 fixedly resting upon the floor board 10 and also comprise a stanchion strap 54 whose upper end is apertured at 62 for mounting one of the nut trunnions therethrough. One edge of the respective straps may be provided with a tongue 55, which tongues are placed in overlapping relation and secured together as at 56 to constitute a unitary prop; said prop is preferably located immediately behind the transverse trim plate 60 and may be riveted thereto as shown.

The length of said plate as measured crosswise of the rails, is preferably kept relatively short so as to allow the respective forward ends of the risers 31 to clear and pass by said plate without interference. In the particular adjusted seat position that is shown in Fig. 6 the vertical forward riser edge has been moved into alignment with the rearward face of the trim plate; for some different screw setting, said forward riser edge may be advanced or withdrawn relative to the stationary trim plate. This forwardly spaced plate is further provided with a guide-hole 63 adapted to receive and uphold the overhanging end portion of the manipulative screw 50 against inadvertent tilting about its nut trunnions.

The forward end of the seat screw 50 is equipt with a groove 57 and a manipulative knob 49. The angular sheet-metal thrust block 58 has one leg secured beneath the base board 22 while its other depending leg or bib-like fork is slotted to form a thrust bearing with said spindle groove. The medial corner region of the thrust block is shown indented to form a rib-like reenforcement 59. By turning the adjusting screw 50, the thrust block will be shifted toward or away from the stationary nut 51 without binding effects even should the bridging mid-region of the base board become warped under extreme seat load. After releasing the rail keepers, the slotted or forked depending thrust block flange may readily be lifted out of engagement with the spindle groove 57 simultaneously with the dismantling of the seat base.

Figure 9:
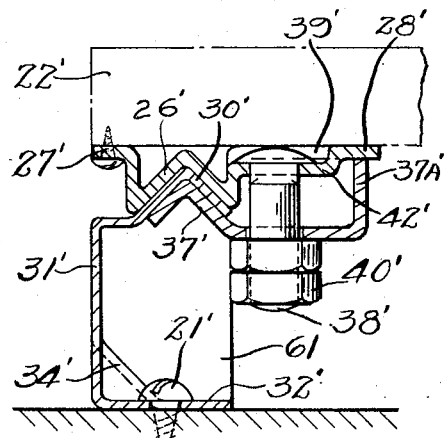
Fig. 9 shows a transverse sectional view of a modified style of my clamped rail devices in which the elements are shown inverted as compared to Fig. 5.

It now remains to direct attention to Fig. 9 showing a cross-sectional view of an inversely mounted track in which the principal guide elements are given primed numerals to correspond with the similar grooved guide-elements that were previously described. In such instances, it is preferred to additionally brace one end of the overhung V piece with a transverse heel or tail flange 61 and have the side-bar riser 31' remain stationary while the V rails and clamps are now made to move bodily with the seat-base. It will be obvious that the underlying carrier principle still remains identical with that embodied in the first described rail structure, although the alternative rail head 26' of Fig. 9 is shown as depressed into a V groove having the side-bar toe 30' entered therein so as to constitute a reversed cooperating tongue member.

It will be observed that in either alternative, the interlocked V elements are kept separable by removal of their clamping nuts 40, whereupon the entire seat together with its attached guide appurtenances may for repair purposes or the like, be bodily lifted directly upward and off the complementary stationary ways; said sliding parts can likewise be reassembled at the minimum of labor and without losing their previously fixed settings.

It is to be understood that the described mechanism also finds application to purposes other than automotive seats, and that various changes in the details or disposition thereof may be resorted to in likewise carrying out my illustrative embodiment, all without departing from the spirit and scope of my invention heretofore described and more particularly pointed out in the following claims.

Claims:

1. In a shiftable vehicle seat or the like, a pair of spaced guide-rails having a cross-sectionally V-shaped head portion, a seat-base mounted crosswise of said rails, side-bar means for each of the rails, each such bar being provided with a toe-strip that slidably cooperates with one of the respective V-shaped rail-heads, releasable keeper means for each of the respective cooperating toe-strips and rail-heads and which keepers each have a portion slidably engaging with their respective to-strips and a bridge-like portion overlapping their respective guide-rails, and fastening means detachably securing the bridge-like portion of said keepers to their respective contiguous guide-rails.

2. In a vehicle seat or the like including an adjustably shiftable cushion carrier, the combination of a pair of spaced guide rails of the superimposed two-part type serving to uphold thereon the respective end regions of said cushion carrier, each such guide rail comprising an apertured rail head member provided with a cross-sectionally V-shaped guide-face and further comprising a side-bar member provided with a toe-flange having a counterpart companion surface mated to slidably contact the aforesaid guide-face, an apertured retaining plate superimposed upon each of said toe-flanges, a screw-bolt for each such retaining plate, the shank of one such screw being entered through one of the rail head apertures and the aperture of its contiguous retaining plate, and adjusting means for shifting the carrier lengthwise of the rails.

3. In a vehicle seat, a pair of spaced guide rails each comprising relatively shiftable companion elements of which one such element is provided with a longitudinal groove of V shaped profile and the other element is provided with a tongue cooperatively guided within such groove, a seat base superimposed crosswise of said rails with the opposite base ends respectively secured to corresponding rail elements, releasable retaining means for each of said corresponding elements and which means upon being released allows the base together with said corresponding rail elements to be lifted bodily away from their respective mated elements, and means for shifting the seat lengthwise of said rails, said means including a grooved screw and a thrust block having an open forked portion depending from said base and mounted to engage the groove of said screw and which fork portion is unrestrictedly withdrawn out of groove engagement when said base is lifted bodily away from the aforesaid mated elements.

4. A vehicle seat comprising a shiftable base, a pair of spaced sheet metal side bars respectively depending from opposite end regions of the base, the lowermost free edges of said bars being respectively equipt with a grooved toe flange having a cross-sectionally V shaped guide face, a stationary guide rail member mounted beneath each such toe flange, said guide rails being respectively provided with an upstanding counterpart that is cooperatively received within the guide face of its contiguous toe flange, a releasable retaining plate superimposed upon each such toe flange, said retaining plates each having a portion slidably engaging their respective toe flanges and a bridgelike portion overlapping the respective guide rails, and fastening means detachably securing the bridgelike portion of said retaining plates to their respective contiguous guide rails.

In testimony whereof, I have herewith set my hand.

BRUCE M. STANNARD.